US012124558B2

(12) United States Patent
Murdoch et al.

(10) Patent No.: US 12,124,558 B2
(45) Date of Patent: Oct. 22, 2024

(54) VISUALIZATION-ASSISTED UPGRADE OF VERIFIABLE CREDENTIAL

(71) Applicant: Microsoft Technology Licensing, LLC, Redmond, WA (US)

(72) Inventors: Brandon Murdoch, Reading (GB); Ankur Patel, Sammamish, WA (US); Guillermo P. Proano, Kirkland, WA (US); Sydney Morton, Seattle, WA (US)

( * ) Notice: Subject to any disclaimer, the term of this patent is extended or adjusted under 35 U.S.C. 154(b) by 243 days.

(21) Appl. No.: 17/334,478

(22) Filed: May 28, 2021

(65) Prior Publication Data

US 2022/0382853 A1 Dec. 1, 2022

(51) Int. Cl.
*G06F 21/45* (2013.01)
*G06F 21/10* (2013.01)
*G06Q 20/36* (2012.01)

(52) U.S. Cl.
CPC .............. *G06F 21/45* (2013.01); *G06F 21/10* (2013.01); *G06Q 20/36* (2013.01)

(58) Field of Classification Search
CPC ....................................................... G06F 21/45
See application file for complete search history.

(56) References Cited

U.S. PATENT DOCUMENTS 11,093,207 B1 * 8/2021 Lovelock ................ G06F 3/147
2016/0078434 A1 * 3/2016 Huxham ................ G06Q 20/36 705/71
2017/0032363 A1 * 2/2017 Bhatt ................. G06Q 20/3672
2018/0270245 A1 * 9/2018 Akkaraju ................ G06F 21/10
2020/0035059 A1 * 1/2020 Campero .............. H04L 63/101
2020/0220726 A1 * 7/2020 Lougheed, III ....... G06F 16/211
2020/0403805 A1 * 12/2020 Steele ................... G06F 21/602
2021/0141517 A1 * 5/2021 Camargo .............. H04L 67/535
2021/0250362 A1 * 8/2021 Spurlock ................. G06F 21/10
2022/0382853 A1 * 12/2022 Murdoch ............... H04L 63/10

FOREIGN PATENT DOCUMENTS

WO 2020201368 A1 10/2020

OTHER PUBLICATIONS

"International Search Report & Written Opinion issued in PCT Application No. PCT/US22/027950", Mailed Date : Jul. 20, 2022, 12 Pages.

* cited by examiner

*Primary Examiner* — Dao Q Ho
(74) *Attorney, Agent, or Firm* — Workman Nydegger

(57) ABSTRACT

Upgrading of a verifiable credential by a user interfacing with an upgrade control of a visualization of the verifiable credential. The upgradable verifiable credential includes an authorization claim specifying an authorization scope, and an enhancement claim specifying a condition for enhancing the specified authorization scope. A visualization of the upgradable verifiable credential is then display with the upgrade control to a user of a holder computing system that is the holder of the verifiable credential. Accordingly, if the user interacts with the upgrade control, the condition for upgrading the verifiable credential may be accomplished. The issuer of the authorization claim may then be notified of this. The issuer may then provide an ungraded verifiable credential that includes an authorization claim that includes more or a different authorization scope than the prior verifiable credential.

20 Claims, 8 Drawing Sheets

VISUALIZATION-ASSISTED UPGRADE OF VERIFIABLE CREDENTIAL

BACKGROUND

Existing computing technologies provide for a data structure called a "verifiable credential". In these technologies, a claims issuer makes one or more claims about a subject, and generates the verifiable credential. Each claim includes a property-value pair. The verifiable credential include those claim(s) as well as proof instructions (e.g., metadata) to prove that claim(s) have not been tampered with and were indeed issued by the claims issuer. The claims issuer then provides the verifiable credential to a claims holder, for presentation to any relying party that relies upon the veracity of those claims. The relying party computing system then follows the proof instructions to thereby prove that the claim is true.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein permit for initiating upgrading of a verifiable credential. This may be accomplished from within a digital wallet in which the verifiable credential is visualized. The upgradable verifiable credential includes a set of one or more verifiable claims including an authorization claim and an enhancement claim. The authorization claim specifies an authorization scope of a subject. The enhancement claim specifies a condition for enhancing the authorization scope specified in the authorization claim. A visualization of the upgradable verifiable credential is then display to a user of a holder computing system that is the holder of the verifiable credential. This visualization may perhaps be made within a digital wallet of the holder. The visualization includes an upgrade control that is configured to respond to user interaction to at least partially accomplish the condition.

Accordingly, if the user interacts with the upgrade control, the condition for upgrading the verifiable credential may be accomplished. The issuer of the authorization claim may then be notified. Upon the issuer computing system verifying that the condition has been met, the issuer computing system may then provide an upgraded verifiable credential that includes an authorization claim that includes more authorization than the prior verifiable credential. Thus, the user may conveniently upgrade authorization of a verifiable credential by interfacing with the visualization of the verifiable credential.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein permit for initiating upgrading of a verifiable credential. This may be accomplished from within a digital wallet in which the verifiable credential is visualized. The upgradable verifiable credential includes a set of one or more verifiable claims including an authorization claim and an enhancement claim. The authorization claim specifies an authorization scope of a subject. The enhancement claim specifies a condition for enhancing the authorization scope specified in the authorization claim. A visualization of the upgradable verifiable credential is then display to a user of a holder computing system that is the holder of the verifiable credential. This visualization may perhaps be made within a digital wallet of the holder. The visualization includes an upgrade control that is configured to respond to user interaction to at least partially accomplish the condition.

Accordingly, if the user interacts with the upgrade control, the condition for upgrading the verifiable credential may be accomplished. The issuer of the authorization claim may then be notified. Upon the issuer computing system verifying that the condition has been met, the issuer computing system may then provide an upgraded verifiable credential that includes an authorization claim that includes more authorization than the prior verifiable credential. Thus, the user may conveniently upgrade authorization of a verifiable credential by interfacing with the visualization of the verifiable credential.

In order to introduce the reader to the concept of a verifiable credential, an example verifiable credential 100 will first be described with respect to FIG. 1. Furthermore, an environment 200 in which a verifiable credential is created and used will then be described with respect to FIG. 2. Thereafter, the principles of the embodiments herein will be described with respect to FIGS. 3 to 8.

As used herein, an “issuer” is an entity that makes at least one assertion about a subject. That assertion is also called herein a “claim”. A “credential” is a set of one or more claims. As the term is used herein, a “credential” can include claims made by multiple issuers, but the term also applies to a set of claims having a single issuer. A “verifiable credential” is a credential in which cryptographic mechanisms (such as a digital signature) are used to detect whether the credential has been tampered with since the time that the credential was issued, and can be used to verify identity of the issuer of the credential. Claims within a verifiable credential need not be about the same subject, and the subject of any claim need not be the same as a holder of the verifiable credential.

Figure 1:
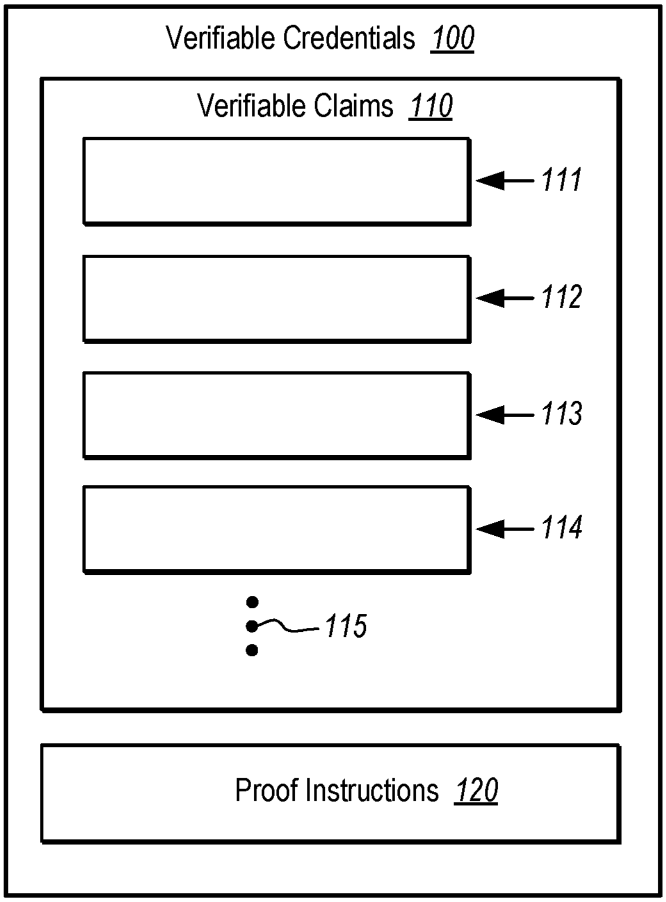
FIG. 1 illustrates a verifiable credential that includes multiple verifiable claims, and proof instructions for proving the claims were made by an issuer.

FIG. 1 illustrates a verifiable credential 100 that includes multiple verifiable claims 110. The verifiable claims 110 are shown as including four verifiable claims 111 through 114, though the ellipsis 115 represents that the verifiable credential 100 may include any number (one or more) of verifiable claims. The verifiable credential 100 also includes proof instructions 120 that are used to verify that the verifiable credential 100 has not been tampered with since the verifiable credential 100 was created by the issuer of the verifiable credential 100, and to verify the identity of the issuer of the verifiable claims 110. An example of a proof instruction is a digital signature of the issuer. Verifiable credentials in which proof instructions are used to prove claims are known in the art.

Figure 2:
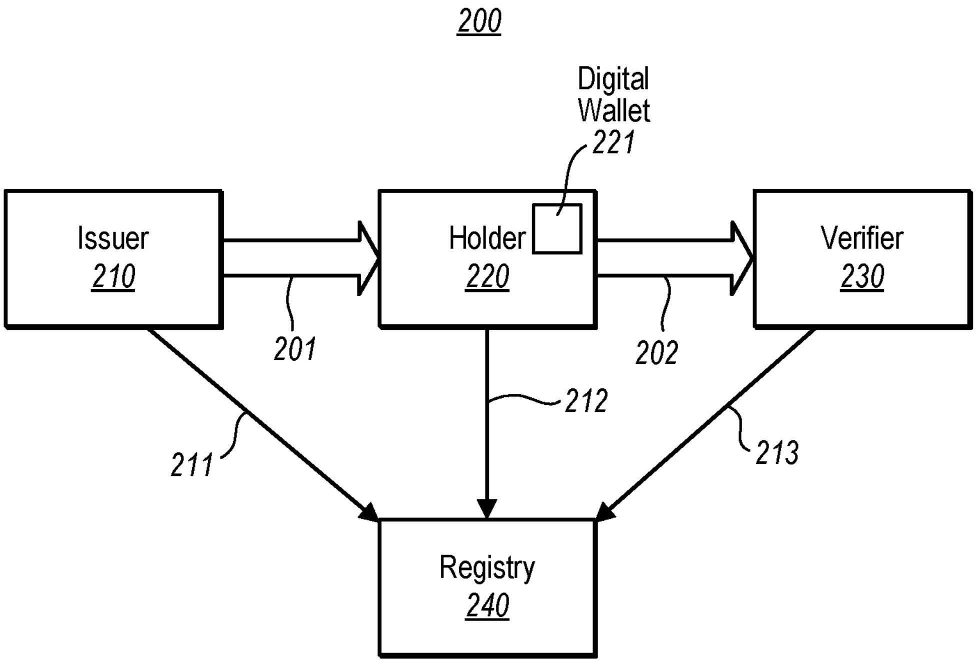
FIG. 2 illustrates an environment in which a verifiable credential (such as the verifiable credential of FIG. 1) is created and used.

FIG. 2 illustrates an environment 200 in which a verifiable credential (such as verifiable credential 100 of FIG. 1) is created and used. The environment 200 includes an issuer computing system 210 that operates within a sphere of trust of an issuer. Examples of issuers include corporations, organizations, associations, governments, agencies, individuals, or any other entity that can make assertions that could be relied upon by others. The issuer performs the role of asserting claims, causing the issuer computing system 210 to create a verifiable credential (such as verifiable credential 100 of FIG. 1) for these claims, and causing the issuer computing system 210 to transmit the verifiable credential to a holder computing system 220 as represented by arrow 201. The issuer computing system 210 may also be referred to herein as simply “issuer system 210” and its user referred to as an “issuer”. As represented by arrow 211, the issuer system 210 also transmits verify identifiers and use schemas to a registry computing system 240.

As also represented by arrow 201, a holder computing system 220 acquires the transmitted verifiable credential. The holder computing system 220 operates on behalf of a holder, who uses the holder computing system 220 to possess and potentially store the verifiable credential. As represented by arrow 202, the holder also causes the holder computing system to present the verifiable credential to a verifier computing system 230. The holder computing system 220 may also be referred to herein as simply “holder system 220” and its user referred to as a “holder”. As represented by arrow 212, the holder system 220 also transmits identifiers and use schemas to the registry computing system 240.

The holder system 220 presents the verifiable credential itself, or presents data from the verifiable credential in the form of another data structure, which may also be referred to herein as a “verifiable presentation”. A verifiable presentation expresses data from one or more verifiable credentials, and is packaged in such a way that the authorship of the data is verifiable. If verifiable credentials are presented directly, they become verifiable presentations. Data formats derived from verifiable credentials that are cryptographically verifiable, but do not of themselves contain verifiable credentials, are also included within the definition of a verifiable presentation. In addition to presenting the verifiable credential to relying parties, the holder system also may present a digital wallet 221 to the holder, which presents a visualization for each of one or more of the verifiable credentials held by the holder system 220.

As also represented by the arrow 202, a verifier computing system 230 acquires the transmitted verifiable credential (optionally within a verifiable presentation). The verifier computing system 230 operates on behalf of a verifier, which is a relying party that relies on one or more claims made in the verifiable credential. The verifier computing system 230 evaluates whether a verifiable credential is an untampered with (and unexpired) statement of the issuer. This includes following any proof instructions (e.g., proof instructions 120) that are present within the verifiable credential (e.g., verifiable credential 100). The verifier computing system 230 then may take action based on this verification, such as treating the claim(s) made in the verifiable credential as being valid and issued by the issuer.

The verifier computing system 230 will sometimes also be referred to hereinafter as “verifier system 230” and its user referred as a “verifier”. As part of the verification, the verifier 230 sends verify identifiers and schemas to the registry computing system 240, as represented by arrow 213. The users of the issuer system 210, the holder system 220 and the verifier system 230 may be a human, organization, or other entity. For instance, an issuer could be a cloud service.

The registry computing system 240 mediates the creation and verification of identifiers, keys, verifiable credential schemas, revocation registries, issuer public keys, and so on. Example verifiable data registries include trusted databases, decentralized databases, and distributed ledgers. Each of the issuer computing system 210, the holder computing system 220, the verifier computing system 230, and the registry computing system 240 is structured as described below for the computing system 800 of FIG. 8.

Figure 3:
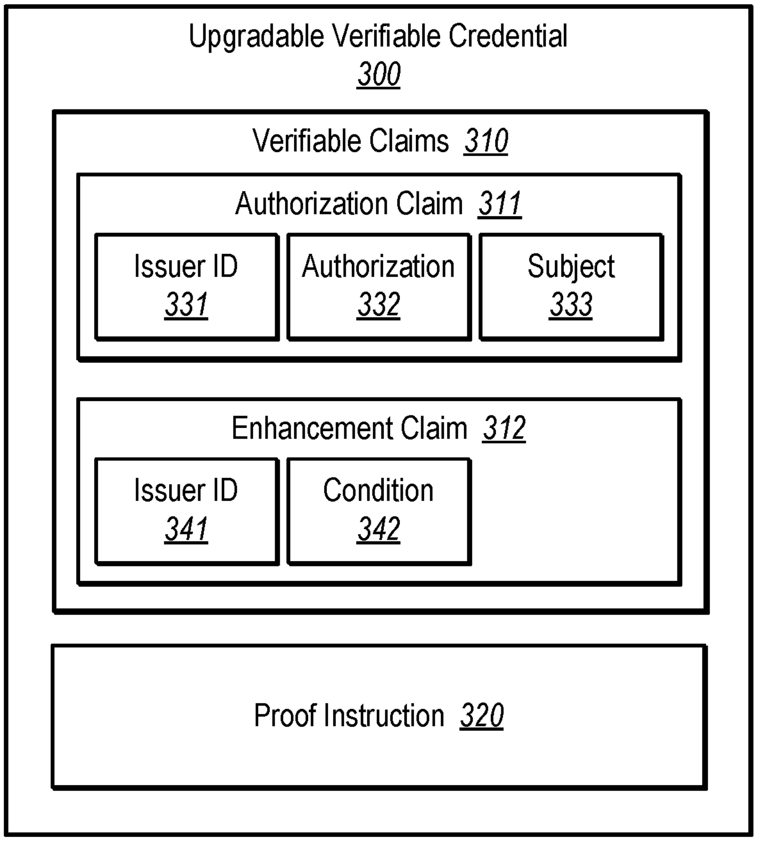
FIG. 3 illustrates an upgradable verifiable credential that includes an authorization claim and an enhancement claim, in accordance with the principles described herein.

FIG. 3 illustrates an upgradable verifiable credential 300 in accordance with the principles described herein. In one example, the holder system 220 of FIG. 2 currently stores the upgradable verifiable credential 300. The upgradable verifiable credential 300 is an example of the verifiable credential 100 of FIG. 1. The upgradable verifiable credential 300 includes a proof instruction 320, which is an example of the proof instruction 120 of the verifiable credential 100 of FIG. 1.

However, the verifiable credential 300 includes a set of one of more verifiable claims 310 that includes specific types of verifiable claims, and that represent an example of the verifiable claims 110 of FIG. 1. In particular, the verifiable claims 310 includes an authorization claim 311 made by an issuer (identified by the issuer identifier 331) specifying an authorization scope 332 of a subject 333. As an example, the subject 333 could be the user of the holder system 220. Or in other words, the subject 333 could be the holder.

The verifiable claims 310 also includes an enhancement claim 312. The enhancement claim 312 is made by an issuer having an issuer identifier 341 and specifies a condition 342 for enhancing the authorization scope 332 specified in the authorization claim 311. The same issuer may have made both the authorization claim 311 as well as the enhancement claim 312. In that case, the authorization claim 311 and the enhancement claim 312 may be consolidated into a single claim, although that is not required.

In one example referred to hereinafter as the "gaming example", the issuer identifiers 331 and 341 each identify a gaming service provider, the subject 333 is a subscriber of the gaming service provider, and the authorization scope 332 is a service level (e.g., silver level). The subject 333 may be the holder of the holder system 220, and use the digital wallet to view visualizations of verifiable credentials. For instance, the silver level of subscription may allow the subscriber free access to a certain core subset of online games offered by the gaming service provider, and perhaps a pay-per-play option on an expanded set of online games. Thus, the holder could present the upgradable verifiable credential to a verifier as proof that the gaming service provider asserts that the holder has a silver level subscription. In the enhancement claim, the gaming service may specify the conditions upon which the subject can attain a gold level subscription, allowing an expanded scope of authorization, including perhaps free access to the expanded set of games.

Figure 4:
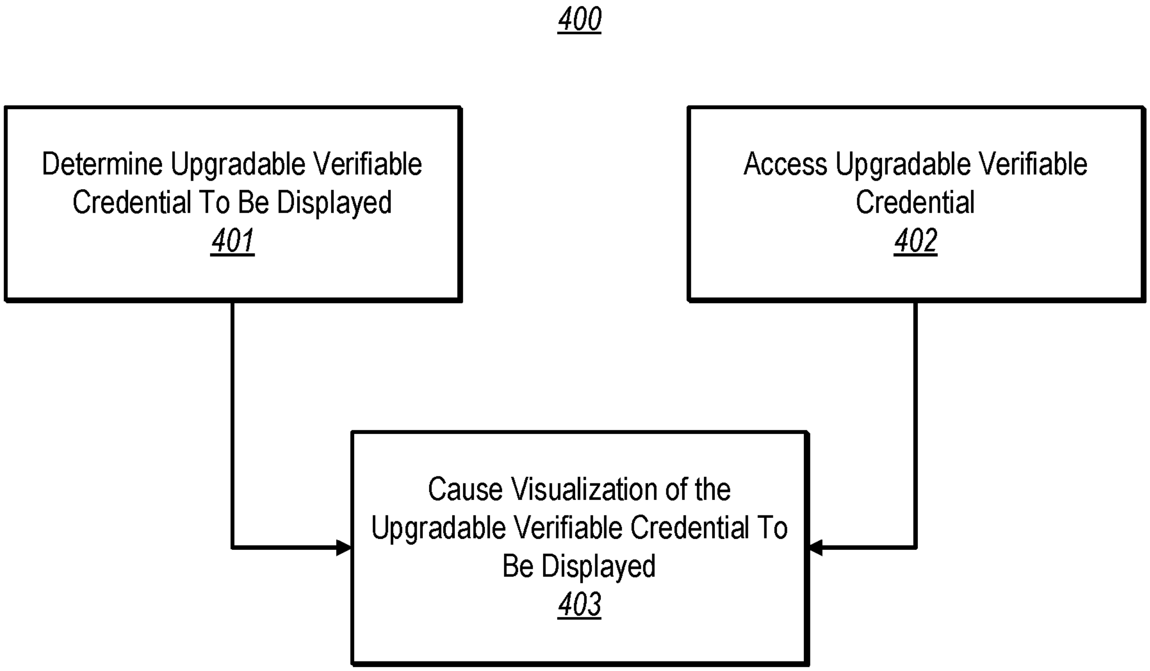
FIG. 4 illustrates a flowchart of a method for initiating upgrading of a verifiable credential, in accordance with the principles described herein.

FIG. 4 illustrates a flowchart of a method 400 for initiating upgrading of a verifiable credential, in accordance with the principles described herein. The method 400 may be performed by the holder system 220 of FIG. 2.

The method 400 includes determining that a visualization of an upgradable verifiable credential is to be displayed on the holder computing system (act 401). In addition, the holder computing system accesses the upgradable verifiable credential (act 402). In response to the determination that the upgradable verifiable credential is to be displayed on the holder computing system (act 401), and after accessing the upgradable verifiable credential (act 402), the holder system causes a visualization of the upgradable verifiable credential to be display to a user of the holder computing system (act 403). As an example, the visualization could be a digital card presented within the digital wallet 221 to the holder of the holder system 220.

Figure 5:
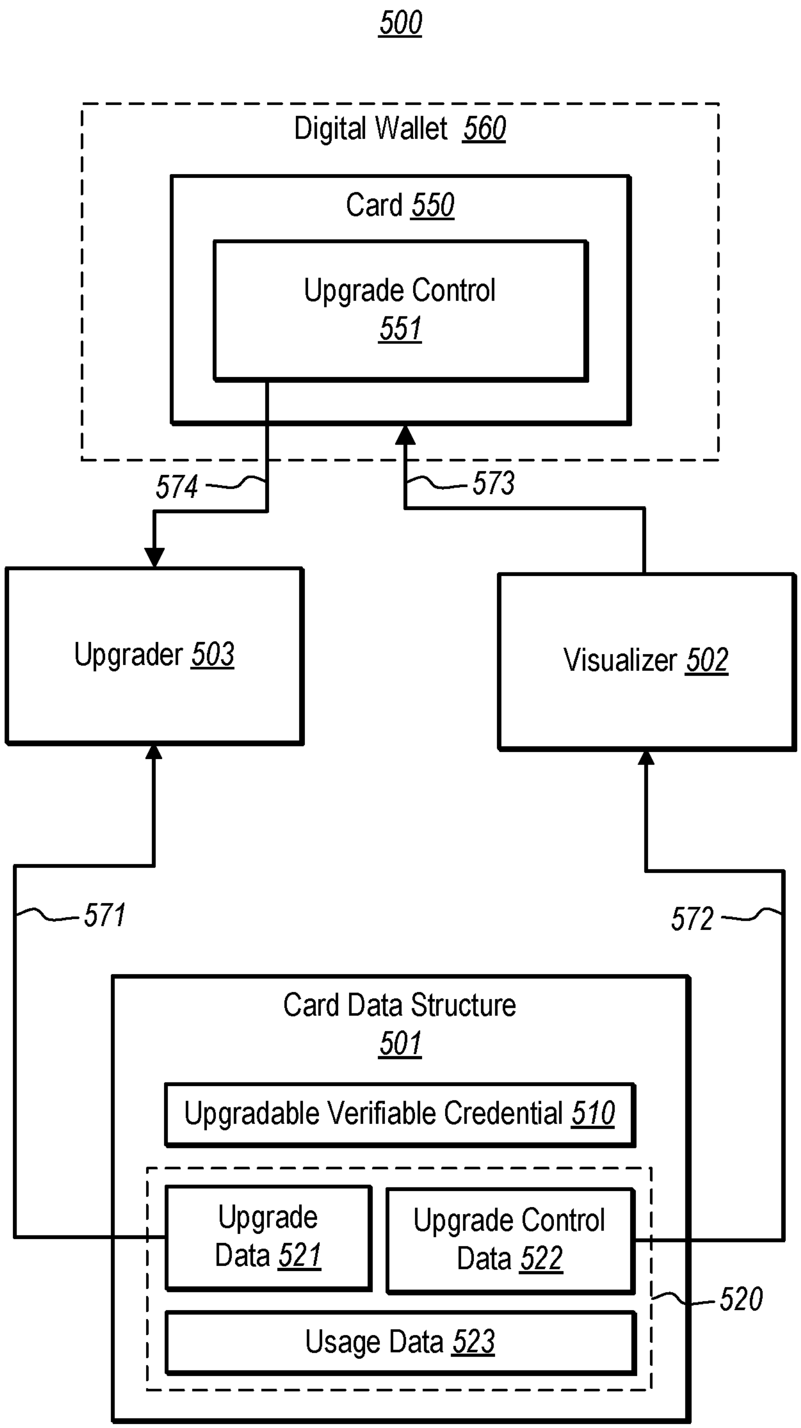
FIG. 5 illustrates a computing environment in which the method may be performed, and in which an upgradable verifiable credential is visualized in the form of a digital card displayed within a digital wallet.

FIG. 5 illustrates a computing environment 500 in which the method 400 may be performed, and in which an upgradable verifiable credential is visualized in the form of a digital card displayed within a digital wallet. Furthermore, the upgradable verifiable credential 300 is an example of the upgradable verifiable credential that is visualized in the method 400. Accordingly, the method 400 will now be described in further detail with respect to the computing environment 500 of FIG. 5 and the upgradable verifiable credential 300 of FIG. 3.

Referring to FIG. 4, the method 400 includes determining that a visualization of an upgradable verifiable credential is to be displayed on the holder computing system (act 401). Referring to the example computing environment 500 of FIG. 5, the upgradable verifiable credential 510 is an example of the upgradable verifiable credential 300 of FIG. 3. This determination may be made in response to the holder having a digital wallet application (also referred to simply as a "digital wallet") open, and perhaps having also selected to view the visualization of the verifiable credential 510.

The method 400 includes accessing the upgradable verifiable credential (act 402). This act may take the form of accessing a card data structure that represents the verifiable credential. In the example of FIG. 5, the visualization of the verifiable credential 510 takes the form of a card 550 that is formulated using a card data structure 501 that is associated with the verifiable credential 510. The card data structure 501 also includes additional data 520 that instructs on how to display the corresponding card 550 that represents the verifiable credential 510. The card 550 can be shown to relying parties (e.g., the verifier of a verifier system) to thereby allow the relying party to access the verifiable credential 510 and its constituent claims (e.g., the authorization claim 311 and the enhancement claim 312).

In response to the determination that the upgradable verifiable credential is to be displayed on the holder computing system (act 401), and after accessing the upgradable verifiable credential (act 402), the holder system causes a visualization of the upgradable verifiable credential to be display to a user of the holder computing system (act 403). In FIG. 5, this is accomplished by the holder system using the digital wallet 560 (which is an example of the digital wallet 221 of FIG. 2) to display the card 550 having the upgrade control 551. Again, this is accomplished using the additional data 520 of the card data structure 501. An example of how the additional data 520 is used to render the card 500 will now be described.

The additional data 520 includes upgrade data 521 that instructs an upgrader component 503 on how to accomplish the condition for upgrade. In the case in which the upgradable verifiable credential 510 of FIG. 5 is the upgradable verifiable credential 300 of FIG. 3. The upgrade data 521 instructs (as represented by arrow 571) the upgrader component 503 on how to at least partially (and potentially how to fully) perform the condition 332 of the upgrade.

Furthermore, the additional data 520 includes upgrade control data 522 that instructs (as represented by arrow 572) a visualizer component 502 on how to display (as represented by arrow 573) the upgrade control 551 in the context of the card 550. For example, the upgrade control data 522 may provide information regarding how the upgrade control 551 is to look, what information is to be visually associated with the upgrade control 551, what user interactions should cause the upgrade control 551 to activate, and so forth. The visualizer component 502, the upgrader component 503, the digital wallet 560, and the upgrade control 551 may each be structured as described below for the executable component 806 of FIG. 8.

The additional data 520 might also include usage data 523. The usage data 523 includes historical information about how the verifiable credential is being used. As examples, the usage data includes frequency with which the verifiable credential is exposed to relying party computing systems, an identity of a relying party computing system to which the verifiable credential was last exposed, a time that the verifiable credential was last exposed, a device that was used to present the verifiable credential, a summary of transactions that used the verifiable credential, and so forth.

Figure 6:
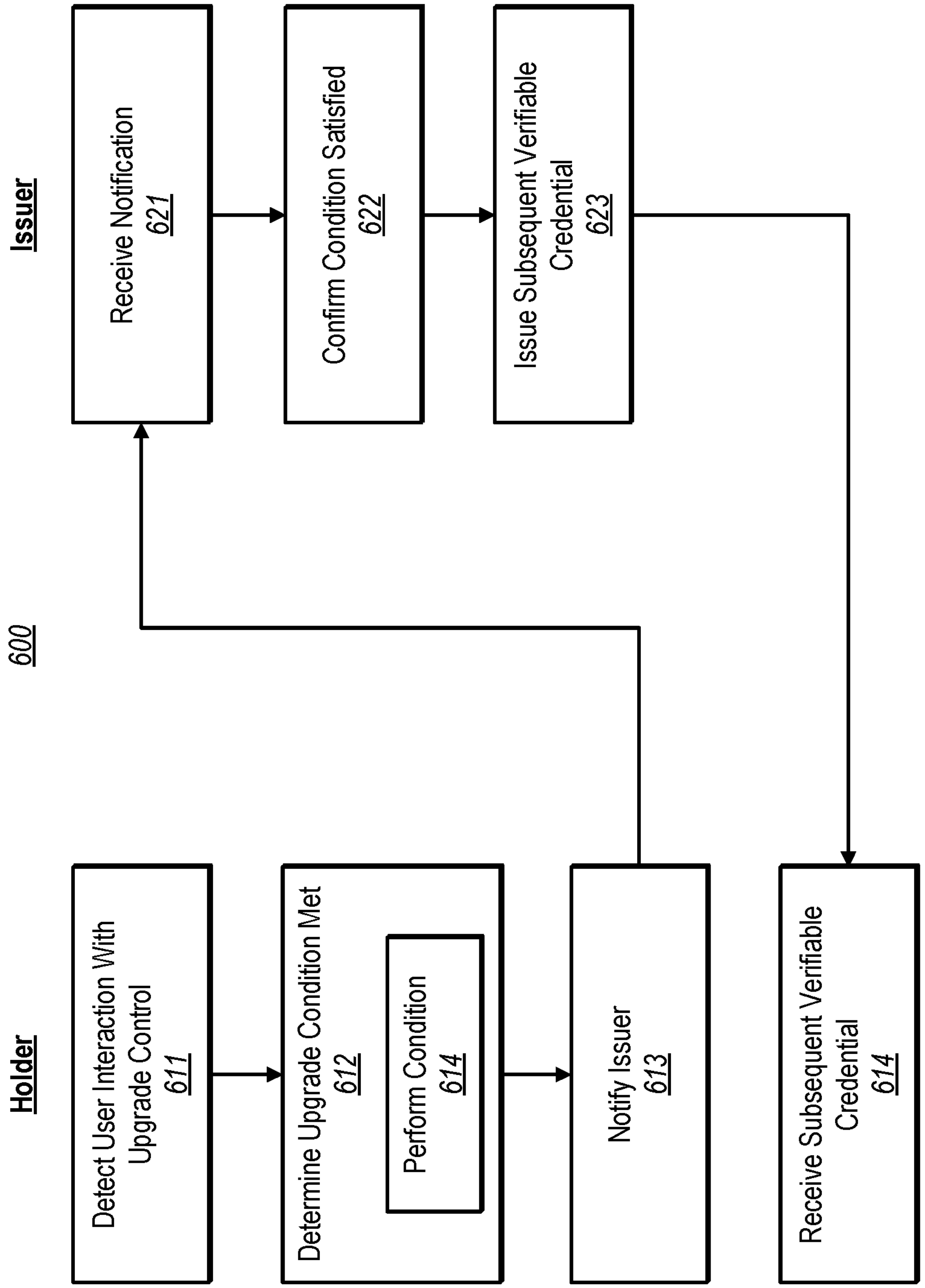
FIG. 6 illustrates a method for performing the upgrade, in accordance with the principles described herein.

FIG. 6 illustrates a method 600 for performing the upgrade, in accordance with the principles described herein. Some of the acts of the method 600 may be performed by the holder system 220 of FIG. 2, as listed in the left half of FIG. 6 under the header "Holder". Other of the acts of the method 600 may be performed by the issuer system 230 of FIG. 2, as listed in the right half of FIG. 6 under the header "Issuer".

The method 600 is performed in the context of a visualization of an upgradable verifiable credential already being displayed to a user of a holder system, and with the visualization including an upgrade control that is configured to response to user interaction to at least partially (and perhaps fully) accomplish the condition.

The method 600 is initiated upon appropriate user interaction with the upgrade control (act 611). Referring to FIG. 5, the user may have opened the digital wallet 560, displayed the card 550, and interacted with the upgrade control 551 to be activated. This in turn, results in the upgrader 503 being notified of the activation (as represented by arrow 574).

The holder system then detects that the condition for upgrading has been satisfied (act 612). For example, if the verifiable credential 510 of FIG. 5 is the verifiable credential 300 of FIG. 3, the holder system verifies that the condition 342 has been met. This may be performed by the upgrader component 503 of FIG. 5. Part of this act may actually include at least partially or fully performing the condition (act 614).

In the gaming example, for instance, perhaps the condition for upgrading is for the user to have 1) accepted terms of service, and 2) paid a subscription fee. The upgrader component 503 may verify that the user has accepted the terms of service by checking a state of the upgrade control 551 and/or the card data structure 501, or some other location of memory. The upgrader 503 may perform some of the condition such as presenting the terms of service to the user in an additional user interface element, and detect acceptance of the terms that way via detecting interaction with an additional user interface element.

Furthermore, the upgrader 502 may actually perform the payment of the subscription fee automatically. The upgrader 502 may also present an additional user interface element that asks the user for confirmation that they wish to make the payment. From the user's perspective, they merely were notified of the subscription fee, accepted the terms of service, and activated the upgrade control 551.

Referring again to FIG. 6, the holder system then notifies the issuer system (act 613). The issuer system then receives the notification (act 621), and may interpret the notification as being a representation by the holder that the upgrade is satisfied, and as a request to upgrade the holder's authorization scope. The issuer system then confirms that the condition has indeed been satisfied (act 622), and if so, issues a subsequent verifiable credential (act 623). That subsequent verifiable credential is then received by the holder system (act 614).

Figure 7B:
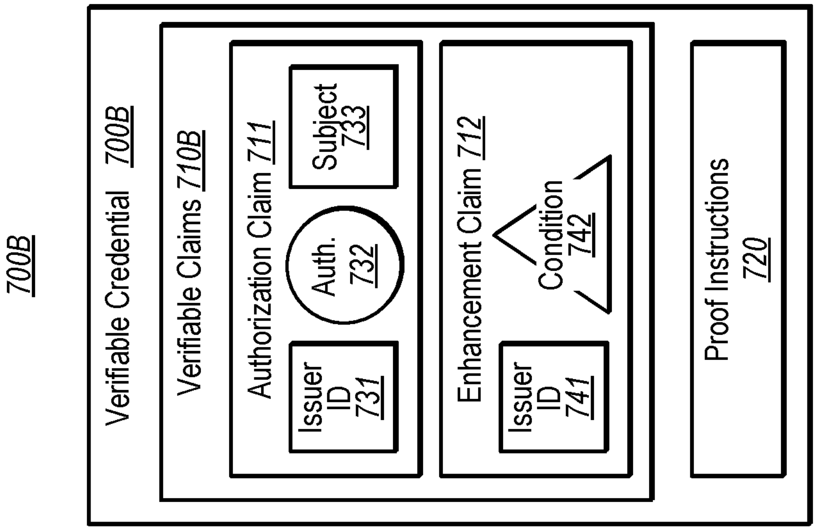
FIG. 7B illustrates another example of the subsequent verifiable credential, which is in this case is a second upgradable verifiable credential.
Figure 7A:
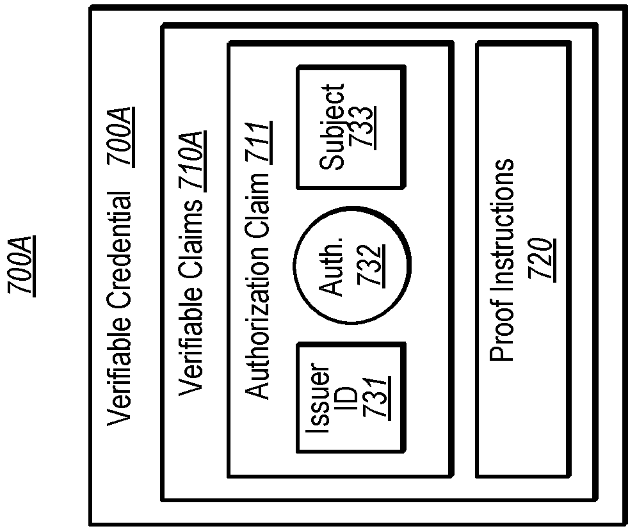
FIG. 7A illustrates an example of the subsequent verifiable credential, which includes proof instructions, and verifiable claims that include an authorization claim.

FIG. 7A illustrates an example of the subsequent verifiable credential 700A, which includes proof instructions 720, and verifiable claims 710A that include an authorization claim 711. The authorization claim 711 is a statement by the issuer having the issuer identifier 731 that the subject 733 has a particular authorization scope 732. In the case of the card data structure 501 being associated with the upgradable verifiable credential 310, the authorization claim 711 may be similar to the authorization claim 311, except with a different authorization scope. In the gaming example, the authorization scope may represent that the holder now has a gold subscription status. Thus, the authorization scope 732 may be an enhancement of the prior authorization scope 332. This enhanced authorization scope 732 is symbolized by it being illustrated as a circle in FIG. 7A.

FIG. 7B illustrates another example of the subsequent verifiable credential 700B, which in this case is a second upgradable verifiable credential 700B. The second upgradable verifiable credential 700B also includes proof instructions 720. However, here, the verifiable credential 700B includes both the authorization claim 711 as well as an enhancement claim 712. Here, the enhancement claim is made by an issuer identified by the issuer identifier 741, and specifies another condition 742 for further upgrading the authorization scope 732 specified in the authorization claim 711.

Here, the process has come full circle. The methods 400 and 600 may then be applied on the second upgradable verifiable credential 700B just as the methods 400 and 600 were applied to the first upgradable verifiable credential 300. That is, a visualization of the second upgradable verifiable credential 700B may be caused to appear to the holder of the holder system along with an associated upgrade control. The holder may then interface with that second upgrade control thereby at least partially (and potentially fully) accomplishing the condition. The issuer may then again be notified, allowing the issuer system to verify that the condition is satisfied. Thereafter the issuer system issues a new further upgraded verifiable credential to the user, thereby again returning full circle. This may repeat again and again, allowing the holder to upgrade their verifiable credential in a semi-automated or fully automated way.

What has been described is a mechanism to allow a holder to at least partially automate the upgrading of a verifiable credential. For instance, a holder could upgrade their subscription status with a subscription service. As another example, a college student may upgrade their university status from an admitted status to an enrolled status to an attending status to an alumni status. These upgrades may be initiated by having the user interface with a visualization of the verifiable credential. Thus, with an in-wallet experience in which the digital wallet contains electronic cards associated with verifiable credentials, the user may drive upgrading of their electronic cards by semi-automation or full automation of the performance of conditions required to upgrade.

Because the principles described herein are performed in the context of a computing system, some introductory discussion of a computing system will be described with respect to FIG. 8.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 8:
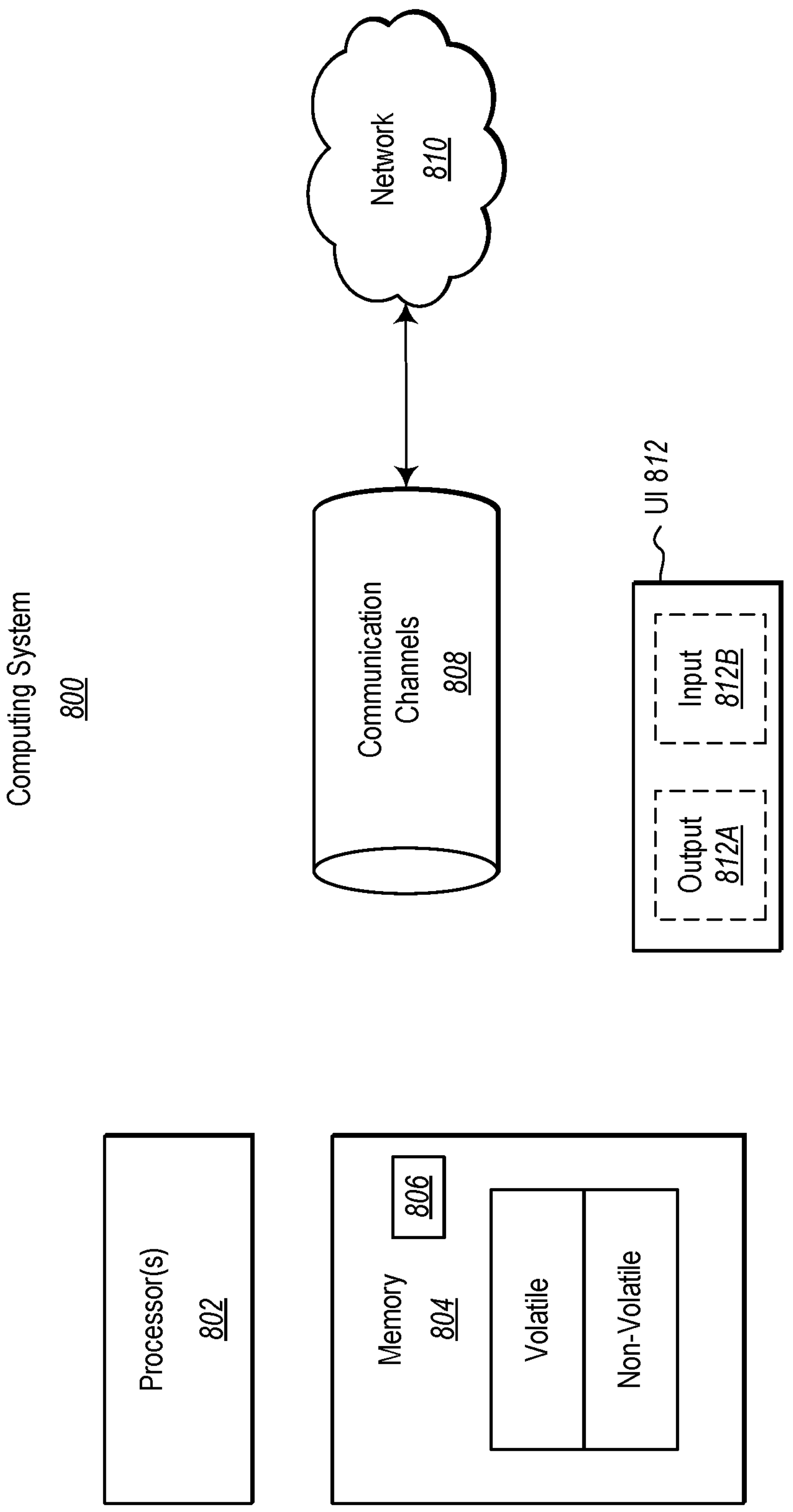
FIG. 8 illustrates an example computing system in which the principles described herein may be employed.

As illustrated in FIG. 8, in its most basic configuration, a computing system 800 includes at least one hardware processing unit 802 and memory 804. The processing unit 802 includes a general-purpose processor. Although not required, the processing unit 802 may also include a field programmable gate array (FPGA), an application specific integrated circuit (ASIC), or any other specialized circuit. In one embodiment, the memory 804 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 800 also has thereon multiple structures often referred to as an "executable component". For instance, the memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 804 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface system 812 for use in interfacing with a user. The user interface system 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, virtual or augmented reality, holograms and so forth. Examples of input mechanisms 812B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A holder computing system for holding an upgradable verifiable credential, which enables a subject of the upgradable verifiable credential to transition from having a first authorization level to having a second, higher authorization level, the holder computing system comprising:

one or more processors; and one or more hardware storage devices that store instructions that are executable by the one or more processors to cause the holder computing system to:

determine that a visualization of an upgradable verifiable credential is to be displayed on the holder computing system;

access the upgradable verifiable credential, the upgradable verifiable credential including:

multiple different verifiable claims, which include corresponding issuer identifications (ID), corresponding authorization scopes, and corresponding subjects, wherein the multiple different verifiable claims include:

a first verifiable claim comprising a first authorization claim specifying a first authorization scope for a first subject, and a second verifiable claim directed to a second subject that is different than the first subject, the second subject is not directed to a user of the holder computing system, a first enhancement claim for the first verifiable claim, the first enhancement claim comprising a first enhancement issuer ID and a first enhancement condition specifying how to enhance the first authorization scope, wherein the first authorization scope is initially set to a first authorization level, and wherein, as a part of the first authorization scope being enhanced, the first authorization scope transitions from providing the first subject the first authorization level to providing the first subject a second, higher authorization level; and in response to the determination that the visualization of the upgradable verifiable credential is to be displayed on the holder computing system, and after accessing the upgradable verifiable credential, cause the visualization of the upgradable verifiable credential to be displayed to the user of the holder computing system, the visualization including an upgrade control that is configured to respond to user interaction to at least partially accomplish the first enhancement condition.

2. The holder computing system in accordance with claim 1, the computer-executable instructions further structured such that the upgrade control is configured to respond to user interaction to fully accomplish the first enhancement condition.

3. The holder computing system in accordance with claim 1, the computer-executable instructions further structured such that if the first enhancement condition is satisfied, the holder computing system notifies an issuer computing system.

4. The holder computing system in accordance with claim 3, the notification including a presentation of the upgradable verifiable credential.

5. A method performed by a holder computing system for holding an upgradable verifiable credential, which enables a subject of the upgradable verifiable credential to transition from having a first authorization level to having a second, higher authorization level, the method comprising:

determining that a visualization of an upgradable verifiable credential is to be displayed on the holder computing system;

accessing the upgradable verifiable credential, the upgradable verifiable credential including (i) a first verifiable claim including an authorization claim specifying an authorization scope of the subject and (ii) a second verifiable claim directed to a different subject, which is also different than a user associated with the holder computing system such that the different subject of the second verifiable claim is not the same as the user of the holder computer system and such that the upgradable verifiable credential includes multiple different verifiable claims, the authorization scope initially being at the first authorization level, and including an enhancement claim specifying a condition for enhancing the authorization scope specified in the authorization claim, wherein, as a part of the authorization scope being enhanced, the authorization scope transitions from providing the subject the first authorization level to providing the subject the second, higher authorization level; and in response to the determination that the visualization of the upgradable verifiable credential is to be displayed on the holder computing system, and after accessing the upgradable verifiable credential, causing the visualization of the upgradable verifiable credential to be displayed to the user of the holder computing system, the visualization including an upgrade control that is configured to respond to user interaction to at least partially accomplish the condition.

6. The method in accordance with claim 5, further comprising:

detecting user interaction with the upgrade control.

7. The method in accordance with claim 6, further comprising:

partially accomplishing the condition in response to detecting the user interaction with the upgrade control.

8. The method in accordance with claim 6, further comprising:

fully accomplishing the condition in response to detecting the user interaction with the control.

9. The method in accordance with claim 5, further comprising:

detecting that the condition has been satisfied; and notifying an issuer computing system that the condition is satisfied.

10. The method in accordance with claim 5, the notification including a presentation of the upgradable verifiable credential.

11. A computer system comprising:

at least one processor; and at least one hardware storage device that stores instructions that are executable by the at least one processor to cause the computer system to:

determine that a visualization of an upgradable verifiable credential is to be displayed;

access the upgradable verifiable credential, the upgradable verifiable credential including (i) a verifiable claim including an authorization claim specifying an authorization scope of a subject and (ii) a second verifiable claim directed to a different subject, which is also different than a user associated with the holder computing system such that the different subject of the second verifiable claim is not the same as the user of the holder computer system and such that the upgradable verifiable credential includes multiple different verifiable claims, the authorization scope initially being at a first authorization level, and including an enhancement claim specifying a condition for enhancing the authorization scope specified in the authorization claim, wherein, as a part of the authorization scope being enhanced, the authorization scope transitions from providing the subject the first authorization level to providing the subject a second, higher authorization level; and in response to the determination that a visualization of the upgradable verifiable credential is to be displayed and after accessing the upgradable verifiable credential, cause the visualization of the upgradable verifiable credential to be displayed, the visualization including an upgrade control that is configured to respond to user interaction to at least partially accomplish the condition.

12. The computer system of claim 11, wherein the upgrade control is configured to respond to user interaction to fully accomplish the condition.

13. The computer system of claim 11, wherein a determination is made that the condition is satisfied, and wherein the computer system notifies an issuer computing system.

14. The computer system of claim 13, the notification including a presentation of the upgradable verifiable credential.

15. The computer system of claim 11, wherein accessing the upgradable verifiable credential includes accessing a card data structure that represents the upgradable verifiable credential.

16. The computer system of claim 15, wherein the card data structure includes additional data that instructs on how to display a card corresponding to the card data structure.

17. The computer system of claim 16, wherein the additional data includes usage data detailing historical information about how the upgradable verifiable credential is being used.

18. The computer system of claim 16, wherein the additional data includes usage data detailing a frequency with which the upgradable verifiable credential is exposed to relying party computing systems.

19. The computer system of claim 16, wherein the additional data includes usage data detailing an identity of a relying party computing system to which the upgradable verifiable credential was last exposed.

20. The computer system of claim 16, wherein the additional data includes usage data detailing a time that the upgradable verifiable credential was last exposed.

* * * * *